Patented Apr. 11, 1950

2,503,778

UNITED STATES PATENT OFFICE 2,503,778

METHOD OF PREPARING N,N'-DIPHENYL-p-PHENYLENEDIAMINE

Herbert G. Stone, Kingsport, Tenn., assignor to Eastman Kodak Company, Rochester, N. Y., a corporation of New Jersey No Drawing. Application December 19, 1947, Serial No. 792,831

7 Claims. (Cl. 260—576)

This invention relates to N,N'-diphenyl p-phenylenediamine, and more particularly to an improved method for producing this compound by reacting hydroquinone with aniline in the presence of an alkyl phosphate catalyst.

N,N'-diphenyl p-phenylenediamine is customarily prepared by the reaction of aniline with p-aminophenol or with hydroquinone. When the condensation with p-aminophenol is employed, a catalyst such as anhydrous hydrogen chloride is required. When hydroquinone is the starting material, catalysts such as phosphoric acid, aniline phosphate, or sodium dihydrogen phosphate have been heretofore employed.

These prior processes generally give yields of the desired product of the order of 75–80%. However, these reactions have certain disadvantages in that they develop an appreciable amount of tarry substances as by-products, and there is considerable corrosion of the metal equipment in which the reactions are conducted which can be attributed to the catalysts used. In fact, sometimes the tar formed during the reaction adheres to the walls of the reacting vessel, and is difficult to remove.

It is, therefore, an object of this invention to provide an improved process for condensing hydroquinone with aniline through the use of a catalyst which has little or no corrosive action on ordinary steel equipment and does not readily promote the formation of tar. It is a further object of this invention to provide a more active catalyst for the condensation of hydroquinone with aniline.

I have discovered that the trialkyl phosphates are very suitable for catalyzing the reaction between hydroquinone and aniline, and that they do not readily promote the formation of tars or of other undesirable by-products. The trialkyl phosphates, as employed in accordance with my invention, can be prepared by any of the methods known to the art. Since these phosphates are organic in nature, the desirable improvements obtained in the reaction may be due in part to the fact that they are more soluble in the reaction mixture than catalysts heretofore commonly employed.

The present invention is further illustrated in the following examples:

Example I

A small steel pressure reactor was charged with 110 grams of hydroquinone, 280 grams of aniline, 1.6 grams of triethyl phosphate. This was heated to 300° C. and maintained at this temperature for 4¼ hours at a pressure of 125 pounds per square inch. In the course of this time, 39½ cc. of water was removed from the reaction vessel azeotropically. The reaction mass was then cooled and transferred to a distillation flask. The aniline was removed by distillation at reduced pressure, and the residue was subjected to vacuum distillation. At 0.5 mm. pressure, 31.6 grams of material distilled below 220° C.; 196.5 grams distilled between 220–225° C. and consisted entirely of the desired N,N'-diphenly p-phenylenediamine. This represents a yield of 75.6%, of theoretical.

Example II

The preparation described in Example I was repeated, except that the triethyl phosphate was replaced with trimethyl phosphate. In this case, a yield of 73.2% was obtained.

Example III

A small steel reactor was charged with a 6–1 aniline to hydroquinone molecular ratio with 2 grams of triethyl phosphate per mol. of hydroquinone as catalyst. This was run 7¾ hours at 300° C. at a pressure of 125 pounds per square inch. The unreacted aniline was removed and on distilling the residue under vacuum at 0.5 mm. pressure a yield of 80.5% of the theoretical yield of N,N'-diphenyl p-phenylenediamine was obtained.

Example IV

A small steel pressure reactor was charged with 110 grams of hydroquinone, 280 grams of aniline, and 14 grams of tri-n-butoxyethyl phosphate. This was heated to 300° C. and maintained at this temperature for 2 hours at a pressure of 125 pounds per square inch. Water produced by the reaction was removed from the reaction vessel azeotropically. The reaction mass was then cooled and transferred to a distillation flask. The aniline was removed by distillation at reduced pressure, and the residue was subjected to vacuum distillation. At 0.5 mm. pressure 40 grams of material distilled below 220° C., 167.2 grams distilled between 220–225° C. and consisted entirely of the N,N-diphenyl p-phenylenediamine. This represents a yield of 64.3% of theoretical.

While trimethyl phosphate and triethyl phosphate are the preferred trialkyl phosphates to be employed in accordance with my invention, other trialkyl phosphates can be employed such as tri-n-propyl phosphate, triisopropyl phosphate, tri-n-butyl phosphate, triisobutyl phosphate, tri β-n-butoxyethyl phosphate, dimethoxy n-butoxyethyl phosphate, triethoxyethyl phosphate, and diethoxyethyl n-butoxyethyl phosphate.

As will be noted from the examples, only small amounts of the catalyst are required for the reaction to give good yields. Condensation temperatures may be between 300 and 350° C. and pressures from 125 to 150 pounds per square inch may be employed.

I claim:

1. In a method of preparing N,N'-diphenyl p-phenylene-diamine which comprises condensing hydroquinone with aniline under elevated temperatures and pressures, the improvement which comprises carrying out the reaction in the presence of an organic phosphate catalyst selected from the group consisting of the trialkyl phosphates in which each alkyl group contains from 1 to 4 carbon atoms, and trialkoxyethyl phosphates in which each alkoxy group contains from 1 to 4 carbon atoms, said catalyst being particularly advantageous in that it has substantially no corrosive action on reaction equipment and is productive of substantially no tarry by-products.

2. In a method of preparing N,N'-diphenyl p-phenylenediamine which comprises condensing hydroquinone with aniline under elevated temperatures and pressures, the improvement which comprises carrying out the reaction in the presence of a trialkyl phosphate catalyst in which each alkyl group is a primary alkyl group containing from 1 to 4 carbon atoms, said catalyst being particularly advantageous in that it has substantially no corrosive action on reaction equipment and is productive of substantially no tarry by-products.

3. In a method of preparing N,N'-diphenyl p-phenylenediamine which comprises condensing hydroquinone with aniline under elevated temperatures and pressures, the improvement which comprises carrying out the reaction in the presence of a trialkoxyethyl phosphate in which each alkoxy group is a primary alkoxy group containing from 1 to 4 carbon atoms, said catalyst being particularly advantageous in that it has substantially no corrosive action on reaction equipment and is productive of substantially no tarry by-products.

4. In the method of claim 1, the step which consists in conducting the condensation under the preferred conditions of a pressure of approximately 125 pounds per square inch and at a temperature of approximately 300° C.

5. In a method of preparing N,N'-diphenyl p-phenylenediamine which comprises condensing hydroquinone with aniline under elevated temperatures and pressures in 1-6 molar ratio, the improvement which comprises carrying out the condensation in the presence of trimethyl phosphate catalyst, said catalyst being particularly advantageous in that it has substantially no corrosive action on reaction equipment and is productive of substantially no tarry by-products.

6. In a method of preparing N,N'-diphenyl p-phenylenediamine which comprises condensing hydroquinone with aniline in 1-6 molar ratio, the improvement which comprises carrying out the condensation in the presence of triethyl phosphate catalyst, said catalyst being particularly advantageous in that it has substantially no corrosive action on reaction equipment and is productive of substantially no tarry by-products.

7. In a method of preparing N,N'-diphenyl p-phenylenediamine which comprises condensing hydroquinone with aniline in 1-6 molar ratio, the improvement which comprises carrying out the condensation in the presence of 2 grams of triethyl phosphate per mol. of hydroquinone at a temperature of approximately 300° C. and at a pressure of approximately 125 pounds per square inch, said catalyst being particularly advantageous in that it has substantially no corrosive action on reaction equipment and is productive of substantially no tarry by-products.

HERBERT G. STONE.

REFERENCES CITED

The following references are of record in the file of this patent:

UNITED STATES PATENTS

| Number | Name | Date |
|---|---|---|
| 2,028,074 | Lauter | Jan. 14, 1936 |
| 2,133,825 | Meuser | Oct. 18, 1938 |
| 2,237,866 | Guinot | Apr. 8, 1941 |
| 2,238,320 | Hardman | Apr. 15, 1941 |